(12) United States Patent
Li

(10) Patent No.: US 10,657,905 B2
(45) Date of Patent: May 19, 2020

(54) METHOD AND APPARATUS FOR COMPENSATING FOR BRIGHTNESS OF DISPLAY DEVICE

(71) Applicants: Beijing BOE Optoelectronics Technology Co., Ltd., Beijing (CN); BOE Technology Group Co., Ltd., Beijing (CN)

(72) Inventor: Pengtao Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/146,832

(22) Filed: Sep. 28, 2018

(65) Prior Publication Data
US 2019/0103062 A1    Apr. 4, 2019

(30) Foreign Application Priority Data
Sep. 29, 2017    (CN) .......................... 2017 1 0911573

(51) Int. Cl.
  *G09G 3/34*    (2006.01)
  *G09G 3/36*    (2006.01)
  (Continued)

(52) U.S. Cl.
  CPC .............. *G09G 3/3406* (2013.01); *G01K 1/14* (2013.01); *G01K 13/00* (2013.01); *G09G 3/3607* (2013.01);
  (Continued)

(58) Field of Classification Search
  CPC ..................................................... G09G 3/3406
  (Continued)

(56) References Cited

U.S. PATENT DOCUMENTS

2009/0289965 A1* 11/2009 Kurokawa ........... G09G 3/3406
                                                            345/690
2010/0259572 A1* 10/2010 Yang .................... G09G 3/3413
                                                            345/697
(Continued)

FOREIGN PATENT DOCUMENTS

CN    103398727 A    11/2013
CN    103794174 A    5/2014
(Continued)

OTHER PUBLICATIONS

Office Action issued in corresponding Chinese Patent Application No. 2017109115733, dated Feb. 3, 2019.

*Primary Examiner* — Long D Pham
(74) *Attorney, Agent, or Firm* — McDermott Will & Emery LLP

(57) ABSTRACT

The present disclosure proposes a method and apparatus for compensating for brightness of a display device. The method for compensating for the brightness comprises: acquiring ambient temperature information and display data information of the display device; determining compensation information corresponding to the acquired ambient temperature information and the acquired display data information; and compensating for backlight driving signals and/or the display data information of the display device according to the compensation information to adjust the brightness of the display device.

13 Claims, 3 Drawing Sheets

(51) Int. Cl.
*G01K 1/14* (2006.01)
*G01K 13/00* (2006.01)

(52) U.S. Cl.
CPC .............. *G09G 2320/0233* (2013.01); *G09G 2320/041* (2013.01); *G09G 2320/0626* (2013.01); *G09G 2330/12* (2013.01); *G09G 2360/141* (2013.01); *G09G 2360/145* (2013.01); *G09G 2360/16* (2013.01)

(58) Field of Classification Search
USPC .......................................................... 345/694
See application file for complete search history.

(56) References Cited

U.S. PATENT DOCUMENTS

| | | | | |
|---|---|---|---|---|
| 2012/0212520 | A1* | 8/2012 | Matsui | G09G 3/3611 345/690 |
| 2015/0145972 | A1* | 5/2015 | Irie | G09G 3/34 348/55 |

FOREIGN PATENT DOCUMENTS

| | | |
|---|---|---|
| CN | 101635126 B | 6/2014 |
| CN | 104658509 A | 5/2015 |
| CN | 105913803 A | 8/2016 |
| CN | 106165007 A | 11/2016 |
| CN | 106898289 A | 6/2017 |
| CN | 107079549 A | 8/2017 |
| CN | 107103881 A | 8/2017 |

* cited by examiner

| L125 | L125 | L125 |
|------|------|------|
| L125 | L125 | L125 |
| L125 | L125 | L125 |

| L10  | L40  | L80  |
|------|------|------|
| L110 | L127 | L140 |
| L170 | L210 | L250 |

| 1 | 1 | 1 |
|---|---|---|
| 1 | 1 | 1 |
| 1 | 1 | 1 |

| 1.1 | 1.1 | 1.1 |
|-----|-----|-----|
| 1.2 | 1.2 | 1.2 |
| 1.2 | 1.3 | 1.3 |

METHOD AND APPARATUS FOR COMPENSATING FOR BRIGHTNESS OF DISPLAY DEVICE

CROSS-REFERENCE TO RELATED APPLICATION(S)

This application claims priority from Chinese Patent Application No. CN20171091573.3 filed on Sep. 29, 2017, the entire contents of which are hereby incorporated by reference.

TECHNICAL FIELD

The present disclosure relates to the field of display technologies, and more particularly, to a method and apparatus for compensating for brightness of a display device, and a display apparatus.

BACKGROUND

In the field of display technologies, the display quality of images is an index for judging the performance of a display device, and high-quality image display is a goal that manufacturers have been pursuing. At present, large-sized display devices have been realized, in which, however, there is also a problem of display non-uniformity in terms of brightness. The non-uniformity of the brightness is mainly caused by the non-uniformed electrical properties of Thin Film Transistors (TFT) in a backplane and the non-uniformed backlight supplied by a backlight module disposed on the rear side of the display device.

At present, as technology advances, the performance of liquid crystal displays is continuously optimized. From the perspective of technological development, how to reduce the power consumption of the backlight module is of the greatest interest. At present, backlight-driven local dimming is applied to the backlight design to control the brightness of the backlight, thereby achieving the purpose of reducing power consumption and improving contrast. Although the brightness of the backlight can be adjusted when the backlight driving manner is employed, there is still a problem that the brightness of the display module is not uniform.

SUMMARY

The present disclosure discloses a method for compensating for brightness of a display device, comprising: acquiring ambient temperature information and display data information of the display device; determining compensation information corresponding to the acquired ambient temperature information and the acquired display data information; and compensating for backlight driving signals and/or the display data information of the display device according to the compensation information to adjust the brightness of the display device.

In an embodiment, before the determining compensation information corresponding to the acquired ambient temperature information and the acquired display data information, the method further comprises: establishing and storing correspondence relationship between ambient temperature information and display data information of the display device and compensation information; and the determining compensation information corresponding to the acquired ambient temperature information and the acquired display data information comprises: looking up the compensation information corresponding to the acquired ambient temperature information and the acquired display data information according to the stored correspondence relationship.

In an embodiment, the establishing correspondence relationship comprises: acquiring a nominal brightness value corresponding to a test gray-scale value of the display device at a nominal temperature; acquiring a test brightness value corresponding to the test gray-scale value of the display device at a test temperature; determining a test compensation value corresponding to the test gray-scale value of the display device at the test temperature according to a ratio of the nominal brightness value to the test brightness value; and determining the correspondence relationship according to the test gray-scale value, the test temperature, and a corresponding test compensation value, wherein the display data information of display device comprises the test gray-scale value.

In an embodiment, the acquiring the display data information of the display device comprises: acquiring gray-scale values of respective pixels of the display device; and performing a weighting calculation on the gray-scale values of the respective pixels to obtain a gray-scale value of the display device as the display data information of the display device.

In an embodiment, the display device is divided into a plurality of display areas, and the acquiring display data information of the display device comprises: acquiring gray-scale values of respective pixels of each display area; performing a weighting calculation on the gray-scale values of the respective pixels of each display area to obtain a gray-scale value of the display area; and determining gray-scale values of respective display areas as the display data information of the display device.

In an embodiment, the compensating for backlight driving signals and/or the display data information of the display device according to the compensation information comprises: compensating for the backlight driving signals and/or the display data information corresponding to the respective display areas, respectively, according to the compensation information corresponding to the gray-scale values of the respective display areas.

In an embodiment, the acquiring ambient temperature information of the display device comprises: receiving the ambient temperature information of the display device transmitted by a temperature sensor, being disposed on the display device and adjacent to a liquid crystal layer.

The present disclosure also discloses an apparatus for compensating for brightness of a display device, comprising: a processor; a memory, configure to be coupled to the processor and to store instructions that, when executed on the processor, cause the processor to be configured to: acquire ambient temperature information and display data information of the display device; determine compensation information corresponding to the acquired ambient temperature information and the acquired display data information; and compensate for backlight driving signals and/or the display data information of the display device according to the compensation information to adjust the brightness of the display device.

In an embodiment, the processor is further configured to: establish and store correspondence relationship between ambient temperature information and display data information of the display device and the compensation information, before determining compensation information corresponding to the acquired ambient temperature information and the acquired display data information; and the processor is further configured to: look up the compensation information corresponding to the acquired ambient temperature information and the acquired display data information according to the stored correspondence relationship.

In an embodiment, the processor is further configured to: acquire a nominal brightness value corresponding to a test gray-scale value of the display device at a nominal temperature; acquire a test brightness value corresponding to the test gray-scale value of the display device at a test temperature; determine a test compensation value corresponding to the test gray-scale value of the display device at the test temperature according to a ratio of the nominal brightness value to the test brightness value; and determine the correspondence relationship according to the test gray-scale value, the test temperature, and a corresponding test compensation value, wherein the display data information of the display device comprises the test gray-scale value.

In an embodiment, the processor is further configured to: acquire gray-scale values of respective pixels of the display device; and perform a weighting calculation on the gray-scale values of the respective pixels to obtain a gray-scale value of the display device as the display data information of the display device.

In an embodiment, the display device is divided into a plurality of display areas, and the processor is further configured to: acquire gray-scale values of respective pixels of each display area; and perform a weighting calculation on the gray-scale values of the respective pixels of each display area to obtain a gray-scale value of the display area, determine gray-scale values of respective display areas as the display data information of the display device.

In an embodiment, the processor is configured to compensate for the backlight driving signals and/or the display data information corresponding to the respective display areas, respectively, according to the compensation information corresponding to the gray-scale values of the respective display areas.

In an embodiment, the processor is further configured to: receive the ambient temperature information of the display device transmitted by a temperature sensor, being disposed on the display device and adjacent to a liquid crystal layer.

The present disclosure also discloses a display apparatus comprising the above apparatus for compensating for brightness of a display device.

DETAILED DESCRIPTION

For the purpose that the above objects, features and advantages of the present disclosure will become more apparent and become better understood, the present disclosure will be further described in detail below in conjunction with the drawings and specific implementations.

The present disclosure comprises the following advantages:

The present disclosure acquires ambient temperature information and display data information of a display device, determines compensation information corresponding to the acquired ambient temperature information and the acquired display data information; and performs compensation on backlight driving signals and/or the display data information of the display device according to the compensation information, to adjust the brightness of the display device. The present disclosure takes the influence of the ambient temperature information on the display device into consideration, and determines the compensation information based on the ambient temperature information and the display data information of the display device, so as to realize the adjustment of the brightness of the display device at different temperatures. As such, the problem that the brightness of the display device is not uniform resulting from liquid crystal layers being susceptible to temperature is avoided.

Of course, any of the products implementing the present disclosure does not necessarily need to achieve all of the advantages described above at the same time.

Figures 1, 2, 3:
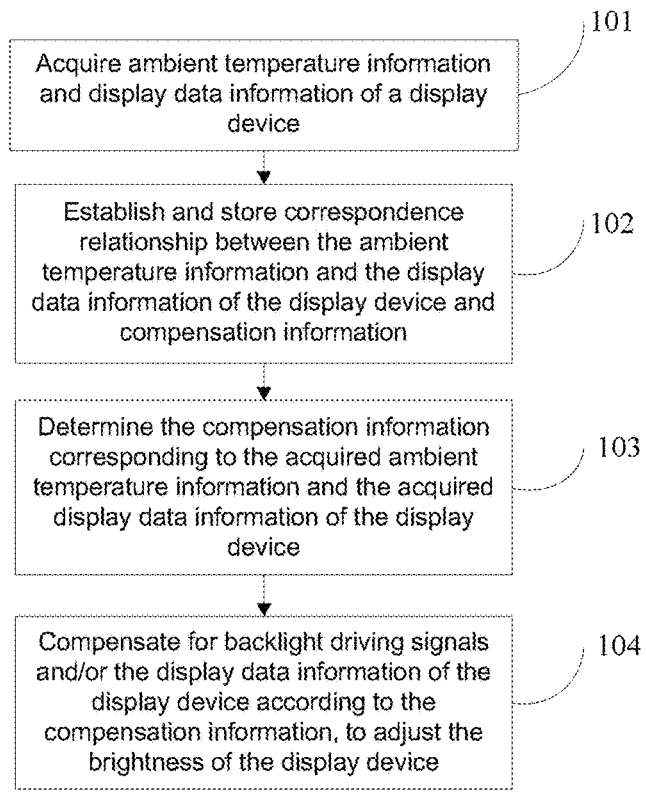
FIG. 1 is a flowchart of a method for compensating for brightness of a display device according to an embodiment of the present disclosure.
FIG. 2 is a schematic diagram of gray-scale values of respective display areas in a display device according to an embodiment of the present disclosure.
FIG. 3 is a schematic diagram of gray-scale values of respective display areas in a display device according to another embodiment of the present disclosure.

FIG. 1 illustrates a flowchart of a method for compensating for brightness of a display device according to an embodiment of the present disclosure.

At step 101: ambient temperature information and display data information of a display device are acquired.

A temperature sensor can be disposed to obtain the ambient temperature information of the display device. For example, the temperature sensor can be disposed on the backplane of a liquid crystal module, or be disposed on the driving circuit of the liquid crystal module, or be directly disposed beside the liquid crystal module, or be disposed on the display device and adjacent to the liquid crystal layer. However, the present disclosure is not limited in this.

The display device proposed by embodiments of the present disclosure may be a liquid crystal display device, an organic light emitting display device, or the like.

In a specific implementation, the acquiring the ambient temperature information of the display device comprises: receiving the ambient temperature information of the display device transmitted from the temperature sensor, which is disposed on the display device and adjacent to the liquid crystal layer.

The display data information can be acquired by an external imaging system, or it can be a picture taken by a camera, or a picture acquired from a picture library, or the like.

In a specific implementation, the step of acquiring the display data information of the display device comprises:
a) gray-scale values of respective pixels of the display device are acquired.

One pixel of the image displayed on the display device that we generally see is composed of three sub-pixels (red, green and blue sub-pixels), and the light source behind each sub-pixel can display different brightness levels. The gray-scale values represent different levels of the brightness from the highest level to the lowest one, and the more levels, the finer the image displayed, and the better the visual effect. For example, 256 brightness levels are referred to as 256 gray-scale values, and the color change of each pixel of the image represents a change in the gray-scale values of the three sub-pixels that make up that pixel.

b) a weighting is performed calculation on the gray-scale values of respective pixels to obtain a gray-scale value of the display device as the display data information of the display device.

In the practical application, the display data information of the entire display device can be acquired. One way to accomplish it is to acquire the gray-scale values of respective pixels of the display device, and perform a weighting calculation on the gray-scale values of respective pixels so as to obtain a gray-scale value of the display device as the display data information of the display device. Another way is to acquire the gray-scale values of respective pixels of the display device, and perform an arithmetic mean calculation on the gray-scale values of respective pixels so as to obtain a gray-scale value of the display device as the display data information of the display device.

In the practical application, a dividing process may be performed on the display device, and then the gray-scale values of respective areas are calculated as the display data information of the display device. In particular, one way to accomplish it is to: divide the display device into a plurality of display areas; acquire the gray-scale values of respective pixels within each display area; perform a weighting calculation on the gray-scale values of respective pixels within each display area so as to obtain a gray-scale value of the display area; and determine the gray-scale values of respective display areas as the display data information of the display device. Another way is to: divide the display device into a plurality of display areas; acquire the gray-scale values of respective pixels within each display area; perform an arithmetic mean calculation on the gray-scale values of respective pixels within each display area so as to obtain a gray-scale value of the display area; and determine the gray-scale values of respective display areas as the display data information of the display device.

At step 102: correspondence relationship between the ambient temperature information and the display data information of the display device and compensation information is established, and the correspondence relationship is stored.

Since different display devices have different circuit design and liquid crystal models, the change of response speed of the display devices due to the change of ambient temperature will also cause a change in the brightness of the display devices. Therefore, there is a need to obtain the correspondence relationship between the ambient temperature information and the display data information of the display device and the compensation information in advance by analyzing experimental data, and to store the compensation information.

In a specific implementation, the correspondence relationship may be stored in a Microcontroller Unit (MCU), which is also known as a Single Chip Microcomputer or SCM, or it may also be stored in a memory in the MCU. The present disclosure is not limited in this.

In a specific implementation, the step of establishing the correspondence relationship between the ambient temperature information and the display data information of the display device and the compensation information comprises:

determining the nominal brightness value corresponding to a test gray-scale value of the display device at nominal temperature;

acquiring the test brightness value corresponding to the test gray-scale value of the display device at test temperature;

determining the test compensation value corresponding to the test gray-scale value of the display device at the test temperature, according to the ratio of the nominal brightness value to the test brightness value;

determining the correspondence relationship according to the test gray-scale value, the test temperature, and a corresponding test compensation value.

The display data information of the display device comprises the test gray-scale value.

At step 103: the compensation information corresponding to the acquired ambient temperature information and the acquired display data information is determined.

In the practical application, the step of determining the compensation information corresponding to the acquired ambient temperature information and the acquired display data information comprises:

looking up the compensation information corresponding to the acquired ambient temperature information and the acquired display data information according to the stored correspondence relationship.

At step 104: the backlight driving signal and/or the display data information of the display device is compensated according to the compensation information so as to adjust the brightness of the display device.

The compensation information comprises a compensation coefficient. The compensation coefficient may be determined by the following steps.

Firstly, the display device divided is divided into a plurality of display areas, and a brightness measuring instrument is employed to measure and record the corresponding test gray-scale values of respective display areas of the display data information and the brightness values corresponding to the test gray-scale values at the test temperature (that is, the brightness value after the display device is lit) on the light exit side of the display device to be tested.

The brightness measuring instrument can be any instrument capable of measuring the brightness of pixels, such as a camera. When the camera captures the gray-scale image of a liquid crystal display panel, the captured brightness value would be more accurate if the resolution of the camera is comparable to that of the liquid crystal display panel.

It should be noted that the display device may be or may not be equally divided into a plurality of display areas. The present disclosure is not limited in this.

Secondly, the brightness values of respective test areas at the test temperature is compared with the nominal brightness value at the nominal temperature, and the ratio thereof is determined as the corresponding compensation coefficients of respective display areas at the test temperature.

As an example, the test gray-scale value of the display device is L125, the nominal temperature is 25° C., and the corresponding nominal brightness value is 600 nit at the nominal temperature. If the temperature of the display device is −20° C., the corresponding brightness value at the temperature of −20° C. is 400 nit, then a compensation coefficient of 1.5 may be determined according to the function f1 (−20° C., L125)=600/400=1.5. Therefore, when the temperature is −20° C., the brightness of the backlight may be raised to 1.5 times of the original brightness, so that the brightness of the display device is the same at different temperatures.

In particular, the step of compensating for the backlight driving signal and/or the display data information of the display device according to the compensation information comprises:

a) compensating for the backlight driving signals and/or the display data information respectively corresponding to respective display areas according to the compensation information respectively corresponding to the gray-scale values of respective display areas;

b) compensating for the backlight driving signals respectively corresponding to the respective display areas according to the compensation coefficients respectively corresponding to the gray-scale values of the respective display areas, thereby adjusting the brightness of respective display areas; and compensating for the display data information respectively corresponding to respective display areas according to the compensation information respectively corresponding to the gray-scale values of respective display areas;

c) compensating for the backlight driving signals corresponding to respective display areas according to the compensation information corresponding to the gray-scale values of respective display areas.

It is found experimentally that the same gray-scale value corresponds to different brightness values at different temperatures. If it is expected that the gray-scale values are the same at different temperatures, the gray-scale values should be changed continuously. The gray-scale values corresponding to the gray-scale values of respective pixels of the display device at different temperatures can be obtained based on experimental data. When the temperature changes, the gray-scale values of respective pixels need to be adjusted to the gray-scale values at the corresponding temperature according to the compensation coefficients of different gray-scale values, thereby realizing the compensation of the display data information corresponding to respective display areas.

In the practical application, the backlight driving signals and the display data information corresponding to the respective display areas may be compensated according to the compensation coefficients corresponding to the gray-scale values of the respective display areas. Moreover, the maximum gray-scale values of respective display areas may be determined, and the brightness of respective display areas may be compensated according to the compensation coefficients, thereby achieving brightness compensation for the display device.

The embodiment of the present disclosure acquires ambient temperature information and display data information of a display device, determines compensation information corresponding to the acquired ambient temperature information and the acquired display data information; and performs compensation on backlight driving signals and/or the display data information of the display device according to the compensation information, to adjust the brightness of the display device. The present disclosure takes the influence of the ambient temperature information on the display device into consideration, and determines the compensation information based on the ambient temperature information and the display data information of the display device, so as to realize the adjustment of the brightness of the display device at different temperatures. As such, the problem that the brightness of the display device is not uniform resulting from liquid crystal layers being susceptible to temperature is avoided.

Further, for the purpose that those skilled in the art can better understand the technical solution defined by the present disclosure, an example of the present disclosure is shown with reference to FIGS. 2-5.

For example, it is assumed that this solution is applied to an 8-bit display device and the display device is divided into 9 display areas.

(1) It is assumed that all the 9 display areas have one single gray-scale value, which is L125, as shown in FIG. 2.

Figures 4, 5, 6:
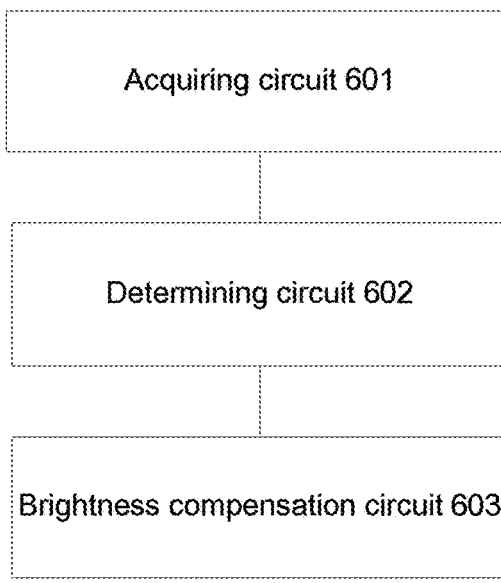
FIG. 4 is a schematic diagram of brightness values corresponding to the gray-scale values of respective display areas of a display device according to an embodiment of the present disclosure.
FIG. 5 is a schematic diagram of compensation information found based on correspondence relationship according to an embodiment of the present disclosure.
FIG. 6 is a block diagram illustrating the structure of an apparatus for compensating for brightness of a display device according to an embodiment of the present disclosure.

(2) As the temperature changes, the gray-scale value of each display area of the display areas shown in FIG. 2 changes, as shown in FIG. 3. However, although the gray-scale value changes, the brightness value of each area does not change in the related art, which, for example, is 1, as shown in FIG. 4. As such, a problem of un-uniform brightness of the display device is prone to be raised.

(3) In order to avoid the problem of un-uniform brightness of the display device, a temperature sensor is added to measure the ambient temperature information of respective display areas of the display device.

(4) The correspondence relationship between the ambient temperature information and the display data information of the display device and the compensation information is established in advance, and stored in the MCU.

As an example, the pre-established correspondence relationship is that, on the basis of 25° C., the compensation information measured at −20° C. is as follows: compensation information of 1.1 for L10, compensation information of 1.1 for L40, compensation information of 1.1 for L80, compensation information of 1.2 for L110, compensation information of 1.2 for L127, compensation information of 1.2 for L140, compensation information of 1.2 for L170, compensation information of 1.3 for L210, and compensation information of 1.3 for L250.

(5) After the temperature of respective display areas of the display device changes, the corresponding compensation information is looked up according to the stored correspondence relationship, and the found compensation information is as shown in FIG. 5.

(6) The backlight driving signals and/or the display data information of the display device is compensated according to the compensation information of respective display areas to adjust the brightness of the display device, so that the brightness of the display device is still the same, when it is at different temperatures.

It should be noted that, for the sake of simple description, the foregoing method embodiments are all described as a combination of a series of actions, however, those skilled in the art should understand that the present disclosure is not limited by the described sequence of the actions, and in accordance with the present disclosure, certain steps may be executed in other sequences or concurrently. Furthermore, those skilled in the art should also understand that the actions involved in the embodiments described in the specification are not necessarily required by the present disclosure.

Based on the description of the foregoing method embodiments, the present disclosure further proposes a corresponding apparatus embodiment to implement the content described in the foregoing method embodiments.

Refer to FIG. 6, which illustrates a structural diagram of an apparatus for compensating for brightness of a display device according to an embodiment of the present disclosure.

In particular, the apparatus for compensating for brightness of a display device may be a Microcontroller Unit (MCU), which is also known as a Single Chip Microcomputer or SCM, or be disposed inside or outside the MCU and communicate with the MCU, so as to realize the control of the liquid crystal module or the backlight driving circuit, or the like.

In particular, the apparatus for compensating for brightness of the display device comprises:

an acquiring circuit 601, which is configured to acquire ambient temperature information and display data information of the display device;

a determining circuit 602, which is configured to determine compensation information corresponding to the acquired ambient temperature information and the acquired display data information;

a brightness compensation circuit 603, which is configured to compensate for backlight driving signals and/or the display data information of the display device according to the compensation information so as to adjust the brightness of the display device.

In an embodiment, the apparatus for compensating for the brightness of the display device further comprises: a compensation relationship circuit, which is configured to establish a correspondence relationship between the ambient temperature information and the display data information of the display device and the compensation information, and to store the same.

The determining circuit comprises a lookup sub-circuit, which is configured to look up the compensation information corresponding to the ambient temperature information and the display data information of the display device according to the correspondence relationship stored in the compensation relationship circuit.

In an embodiment, the compensation relationship circuit comprises:

a nominal sub-circuit, which is configured to obtain a nominal brightness value corresponding to a test gray-scale value of the display device at a nominal temperature;

a test sub-circuit, which is configured to obtain a test brightness value corresponding to the test gray-scale value of the display device at a test temperature;

a compensation sub-circuit, which is configured to determine a test compensation value corresponding to the test gray-scale value of the display device at the test temperature, according to a ratio of the nominal brightness value to the test brightness value;

correspondence relationship sub-circuit, which is configured to determine the correspondence relationship according to the test gray-scale value of the display device, the test temperature, and the corresponding test compensation value, wherein the display data information of the display device comprises the test gray-scale value.

In an embodiment, the acquiring circuit configured to acquire the display data information of the display device, comprises:

a first acquiring sub-circuit, which is configured to acquire gray-scale values of respective pixels of the display device;

a first weighting sub-circuit, which is configured to perform a weighting calculation on the gray-scale values of the respective pixels to obtain a gray-scale value of the display device as display data information of the display device.

In an embodiment, the display device is divided into a plurality of display areas, and the acquiring circuit configured to acquire the display data information of the display device, comprises:

a second acquiring sub-circuit, which is configured to acquire gray-scale values of respective pixels in each display area;

a second weighting sub-circuit, which is configured to perform a weighting calculation on the gray-scale values of respective pixel in each display area to obtain a gray-scale value of the display area, and to determine the gray-scale values of respective display areas as display data information of the display device.

In an embodiment, the brightness compensation circuit is configured to compensate for backlight driving signals and/or the display data information corresponding to respective display areas according to the compensation information corresponding to the gray-scale values of respective display areas.

In embodiment, the acquiring circuit is configured to acquire the ambient temperature information of the display device, and is further configured to:

receiving the ambient temperature information of the display device transmitted by a temperature sensor, which is disposed on the display device and adjacent to a liquid crystal layer.

The embodiment acquires the ambient temperature information and the display data information of the display device, and determines the compensation information corresponding to the acquired ambient temperature information and the acquired display data information; compensates for the backlight driving signals and/or the display data information of the display device according to the compensation information, to adjust the brightness of the display device. The present disclosure takes the influence of the ambient temperature information on the display device into consideration, and determines the compensation information based on the ambient temperature information and the display data information of the display device, so as to realize the adjustment of the brightness of the display device at different temperatures. As such, the problem that the brightness of the display device is not uniform resulting from liquid crystal layers being susceptible to temperature is avoided.

Figure 7:
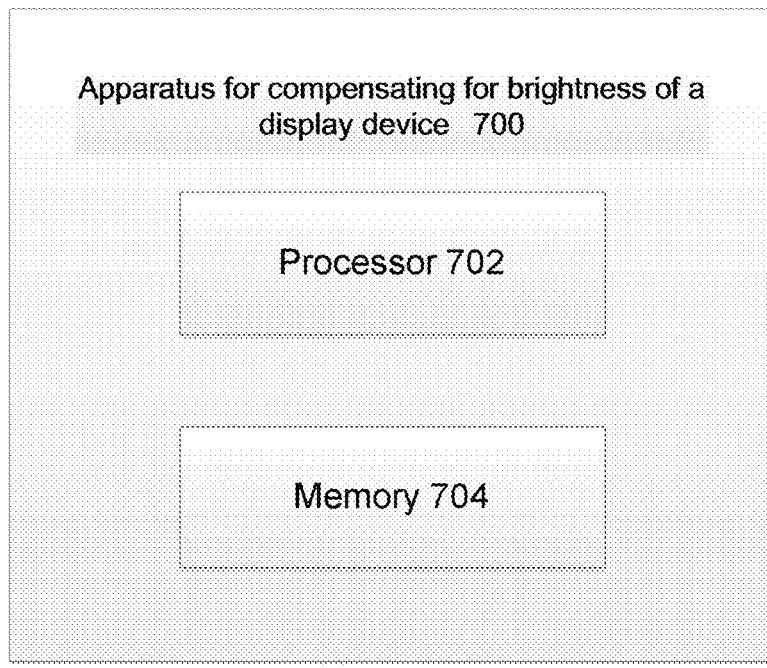
FIG. 7 is a schematic structural diagram of an apparatus for compensating for brightness of a display device according to an embodiment of the present disclosure.

The embodiment of the present disclosure further proposes an apparatus for compensating for brightness of a display device, whose structure diagram is shown in FIG. 7 and which comprises a processor 702 and a memory 704. It should be noted that the structure of the structural schematic diagram of the apparatus for compensating for the brightness of the display device shown in FIG. 7 is merely exemplary and not limiting, and the apparatus for compensating for the brightness may comprise other components depending on the practical application.

In an embodiment of the present disclosure, the processor 702 and the memory 704 can communicate with each other directly or indirectly. Components such as the processor 702 and the memory 704 can communicate with each other via a network connection. The network may include a wireless network, a wired network, and/or any combination of a wireless network and a wired network. The network may include a local area network, the Internet, a telecommunication network, an Internet of Things based on the Internet and/or a telecommunication network, and/or any combination thereof, and the like. The wired network may communicate through, for example, a twisted pair, coaxial cable or fiber optical cable, and the wireless communication network may communicate, for example, in the manner of a 3G/4G/5G mobile communication network, Bluetooth, Zigbee or WiFi. Herein, the type and function of the network may not be specifically limited by the present disclosure.

The processor 702 can control other components in the apparatus for compensating for the brightness of the display device to perform the desired functions. The processor 702 may be a device having data processing capabilities and/or program executing capabilities, such as a central processing unit (CPU), or a graphics processor (GPU), etc. The central processing unit (CPU) may be an X86 or ARM architecture or the like. The GPU can be integrated directly into a motherboard separately or built into a Northbridge chip of the motherboard. The GPU can also be built into the central processing unit (CPU).

The memory 704 may include any combination of one or more computer program products, which may include various forms of computer readable storage media, such as a volatile memory and/or nonvolatile memory. The volatile memory may include, for example, a random access memory (RAM) and/or a cache, and the like. The non-volatile memory may include, for example, a read only memory (ROM), a hard disk, an erasable programmable read only memory (EPROM), a portable compact disk read only memory (CD-ROM), a USB memory, a flash memory, and the like.

One or more computer readable codes or instructions may be stored on the memory 704, and the processor 702 may execute the computer instructions to implement the method for compensating for the brightness of the display device described above. For a detailed description of the processing procedure of the method for compensating for the brightness of the display device, reference may be made to the related description of the method for compensating for the brightness of the display device proposed in embodiments of the present disclosure, and thus details will not be described herein again. Various application programs and various data, such as image data sets and various data used and/or generated by the application programs, etc., can also be stored in the computer readable storage medium.

The present disclosure also discloses a display apparatus comprising the above-described apparatus for compensating for brightness of a display device.

It should be noted that the display apparatus in this embodiment can be applied to any product or component having a display function, such as a mobile phone, a tablet computer, a television, a notebook computer, a digital photo frame, a navigator, and the like.

The display apparatus has all the advantages of the above-described apparatus for compensating for brightness of a display device, and details will not described herein again.

For the above apparatus embodiment, since it is substantially similar to the method embodiment, the description is relatively simple, and relevant parts can refer to the description of the method embodiment shown in FIG. 1.

The various embodiments in the present specification are described in a progressive manner, and each embodiment focuses on differences from other embodiments, and the same or similar parts of the various embodiments can refer to each other.

It will be readily apparent to those skilled in the art that any combination of the various embodiments described above is possible, so any combination of the various embodiments described above is an implementation of the present disclosure, which, however, will not be described one by one in detail in the present specification due to limitations of the space.

In the present disclosure, "component", "apparatus", "system", and the like refer to related entities applied to a computer, such as hardware, a combination of hardware and software, software or software in execution, and the like. In particular, for example, a component can be, but is not limited to, a process running on a processor, a processor, an object, an executable component, a thread of execution, a program, and/or a computer. Also, an application program or script program running on a server, or a server, can be a component. One or more components can be executed in a process and/or thread, and the component can be localized on a one computer and/or distributed between two or more computers and can be run by various computer readable media. The component may also communicate via a local and/or remote process based on a signal having one or more data packets, for example, a signal from data interacting with another component in a local system or a distributed system, and/or interacting with other systems through a signal over the network of the Internet.

Finally, it should also be noted that in this specification, terms such as "first" and "second" are used merely to distinguish one entity or operation from another entity or operation, and do not necessarily require or imply that there is any such actual relationship or order among these entities or operations. Moreover, terms "comprise" and "include" are intended to include not only those elements, but also other elements that are not explicitly listed, or to include elements that are inherent to such a process, method, item, or device. Without more limitations, an element that is defined by the phrase "comprise . . . " does not exclude the presence of the same additional elements in the process, method, item, or device that comprises the element.

Moreover, "and/or" in the foregoing description means that both "and" and "or" are included in the text. In particular, if the relationship between scheme A and scheme B is "and", it means that both the scheme A and the scheme B may be included in a certain embodiment at the same time; and if the relationship between the scheme A and the scheme B is "or", it means that the scheme A may be separately included in a certain embodiment, or the scheme B may be separately included in a certain embodiment.

Those skilled in the art will appreciate that embodiments of the present disclosure can be provided as a method, system, or computer program product. Accordingly, the present disclosure may take the form of an entirely hardware embodiment, an entirely software embodiment, or an embodiment combining software and hardware aspects. Moreover, the present disclosure may take the form of a computer program product embodied on one or more computer usable storage media (including but not being limited to, a disk memory, a CD-ROM, optical memory, etc.) comprising computer usable program code.

The present disclosure is described with reference to flowcharts and/or block diagrams of methods, devices (systems), and computer program products according to embodiments of the disclosure. It will be understood that each flow and/or block of the flowcharts and/or block diagrams as well as the combination of flow and/or block of the flowcharts and/or block diagrams may be implemented by computer program instructions. These computer program instructions can be provided to a processor of a general purpose computer, special purpose computer, embedded processor, or other programmable data processing device to produce a machine, such that an apparatus for implementing the functions specified in one or more flows of the flowchart or in one or more blocks of the block diagram is produced by the instructions executed by a processor of a computer or other programmable data processing device.

The computer program instructions can also be stored in a computer readable memory that can guide a computer or other programmable data processing device to operate in a particular manner, such that the instructions stored in the computer readable memory may produce an article of manufacture comprising an instruction device, which can implement the functions specified in one or more flows in a flowchart and/or one or more blocks in a block diagram.

The computer program instructions can also be loaded onto a computer or other programmable data processing device, such that a series of operation steps are executed on the computer or other programmable device to produce computer-implemented processing, and thus the instructions executed on the computer or other programmable device can provide steps for implementing the functions specified in one or more flows of a flowchart and/or one or more blocks of a block diagram.

Although embodiments of the present disclosure have been described, those skilled in the art can make further changes and modifications to the embodiments once they become aware of the basic inventive concept. Therefore, the appended claims are intended to be interpreted as comprising the embodiments and all the changes and modifications that fall within the scope of the present disclosure.

The method, apparatus for compensating for brightness of a display device as well as the display apparatus proposed by the present disclosure are described in detail above. The principles and implementations of the present disclosure are set forth herein utilizing specific examples, and the description of the above embodiments is only used to facilitate understanding the method of the present disclosure and its core idea; meanwhile, in the light of the idea of the present disclosure, there will be changes in specific embodiments and the scope of application according to the idea of the present disclosure. Therefore, the contents of the specification should not be construed as limiting the present disclosure.

I claim:

1. A method for compensating for brightness of a display device, comprising:
    acquiring ambient temperature information and display data information of the display device;
    determining compensation information corresponding to the acquired ambient temperature information and the acquired display data information; and
    compensating for backlight driving signals and/or the display data information of the display device according to the compensation information to adjust the brightness of the display device,
    wherein before the determining compensation information corresponding to the acquired ambient temperature information and the acquired display data information, the method further comprises:
    establishing and storing correspondence relationship between ambient temperature information and display data information of the display device and compensation information, and
    wherein the establishing correspondence relationship comprises:
    acquiring a nominal brightness value corresponding to a test gray-scale value of the display device at a nominal temperature;
    acquiring a test brightness value corresponding to the test gray-scale value of the display device at a test temperature;
    determining a test compensation value corresponding to the test gray-scale value of the display device at the test temperature according to a ratio of the nominal brightness value to the test brightness value; and
    determining the correspondence relationship according to the test gray-scale value, the test temperature, and a corresponding test compensation value,
    wherein the display data information of the display device comprises the test gray-scale value.

2. The method of claim 1, wherein
    the determining compensation information corresponding to the acquired ambient temperature information and the acquired display data information comprises:
    looking up the compensation information corresponding to the acquired ambient temperature information and the acquired display data information according to the stored correspondence relationship.

3. The method of claim 1, wherein the acquiring display data information of the display device comprises:
    acquiring gray-scale values of respective pixels of the display device; and
    performing a weighting calculation on the gray-scale values of the respective pixels to obtain a gray-scale value of the display device as the display data information of the display device.

4. The method of claim 1, wherein the display device is divided into a plurality of display areas, and the acquiring display data information of the display device comprises:
    acquiring gray-scale values of respective pixels of each display area;
    performing a weighting calculation on the gray-scale values of the respective pixels of each display area to obtain a gray-scale value of the display area; and
    determining gray-scale values of respective display areas as the display data information of the display device.

5. The method of claim 4, wherein the compensating for backlight driving signals and/or the display data information of the display device according to the compensation information comprises:
    compensating for the backlight driving signals and/or the display data information corresponding to the respective display areas, respectively, according to the compensation information corresponding to the gray-scale values of the respective display areas.

6. The method of claim 1, wherein the acquiring ambient temperature information of the display device comprises:
    receiving the ambient temperature information of the display device transmitted by a temperature sensor being disposed on the display device and adjacent to a liquid crystal layer.

7. An apparatus for compensating for brightness of a display device, comprising:
    a processor;
    a memory, configured to be coupled to the processor and to store instructions that, when executed on the processor, cause the processor to be configured to:
    acquire ambient temperature information and display data information of the display device;
    determine compensation information corresponding to the acquired ambient temperature information and the acquired display data information; and
    compensate for backlight driving signals and/or the display data information of the display device according to the compensation information to adjust the brightness of the display device,
    wherein the processor is further configured to: establish and store correspondence relationship between ambient temperature information and display data information of the display device and the compensation information, before determining compensation information corresponding to the acquired ambient temperature information and the acquired display data information, and wherein the processor is further configured to:

acquire a nominal brightness value corresponding to a test gray-scale value of the display device at a nominal temperature;

acquire a test brightness value corresponding to the test gray-scale value of the display device at a test temperature;

determine a test compensation value corresponding to the test gray-scale value of the display device at the test temperature according to a ratio of the nominal brightness value to the test brightness value; and determine the correspondence relationship according to the test gray-scale value, the test temperature, and a corresponding test compensation value, wherein the display data information of the display device comprises the test gray-scale value.

8. The apparatus of claim 7, wherein the processor is further configured to: look up the compensation information corresponding to the acquired ambient temperature information and the acquired display data information according to the stored correspondence relationship.

9. The apparatus of claim 7, wherein the processor is further configured to:

acquire gray-scale values of respective pixels of the display device; and perform a weighting calculation on the gray-scale values of the respective pixels to obtain a gray-scale value of the display device as the display data information of the display device.

10. The apparatus of claim 7, wherein the display device is divided into a plurality of display areas, and the processor is further configured to:

acquire gray-scale values of respective pixels of each display area; and perform a weighting calculation on the gray-scale values of the respective pixels of each display area to obtain a gray-scale value of the display area, determine gray-scale values of respective display areas as the display data information of the display device.

11. The apparatus of claim 10, wherein the processor is configured to compensate for the backlight driving signals and/or the display data information corresponding to the respective display areas, respectively, according to the compensation information corresponding to the gray-scale values of the respective display areas.

12. The apparatus of claim 7, wherein the processor is further configured to:

receive the ambient temperature information of the display device transmitted by a temperature sensor being disposed on the display device and adjacent to a liquid crystal layer.

13. A display apparatus comprising the apparatus for compensating for brightness of a display device of claim 7.

* * * * *